(12) United States Patent
Harley, Jr.

(10) Patent No.: US 9,759,854 B2
(45) Date of Patent: Sep. 12, 2017

(54) INPUT DEVICE OUTER LAYER AND BACKLIGHTING

(71) Applicant: Microsoft Technology Licensing, LLC, Redmond, WA (US)

(72) Inventor: Richard Dean Harley, Jr., Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 14/181,863

(22) Filed: Feb. 17, 2014

(65) Prior Publication Data
US 2015/0234108 A1    Aug. 20, 2015

(51) Int. Cl.
*G06F 3/023*    (2006.01)
*G06F 3/02*    (2006.01)
*F21V 8/00*    (2006.01)

(52) U.S. Cl.
CPC .............. *G02B 6/005* (2013.01); *G06F 3/02* (2013.01); *Y10T 29/49826* (2015.01)

(58) Field of Classification Search
CPC .......... G06F 3/041; G06F 3/042; G06F 1/169; G06F 1/1643
USPC ....................................................... 345/173
See application file for complete search history.

(56) References Cited

U.S. PATENT DOCUMENTS

| 578,325 A | 3/1897 | Fleming |
|---|---|---|
| 4,046,975 A | 9/1977 | Seeger, Jr. |
| 4,065,649 A | 12/1977 | Carter et al. |
| 4,243,861 A | 1/1981 | Strandwitz |
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |

(Continued)

FOREIGN PATENT DOCUMENTS

| EP | 0276048 | 7/1988 |
|---|---|---|
| EP | 1223722 | 7/2002 |

(Continued)

OTHER PUBLICATIONS

"International Search Report and Written Opinion", Application No. PCT/US2015/015083, Apr. 14, 2015, 11 Pages.

(Continued)

*Primary Examiner* — Anabel Ton

(57) ABSTRACT

Input device outer layer and backlighting techniques are described. In one or more implementations, an input device includes a light guide configured to transmit light, a sensor assembly having a plurality of sensors that are configured to detect proximity of an object as a corresponding one or more inputs, a connection portion configured to form a communicative coupling to a computing device to communicate the one or more inputs received by the sensor assembly to the computing device, and an outer layer disposed proximal to the light guide such that the light guide is positioned between the outer layer and the sensor assembly. The outer layer has one or more portions configured to permit transmission of light from the light guide to act as a backlight, the outer layer having a textured outer surface and a smooth inner surface that is disposed proximal to the light guide.

20 Claims, 7 Drawing Sheets

(56) References Cited

U.S. PATENT DOCUMENTS

| | | |
|---|---|---|
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 5,008,497 A | 4/1991 | Asher |
| 5,138,119 A | 8/1992 | Demeo |
| 5,220,521 A | 6/1993 | Kikinis |
| 5,283,559 A | 2/1994 | Kalendra et al. |
| 5,331,443 A | 7/1994 | Stanisci |
| 5,340,528 A | 8/1994 | Machida et al. |
| 5,404,133 A | 4/1995 | Moriike et al. |
| 5,480,118 A | 1/1996 | Cross |
| 5,546,271 A | 8/1996 | Gut et al. |
| 5,548,477 A | 8/1996 | Kumar et al. |
| 5,558,577 A | 9/1996 | Kato |
| 5,576,981 A | 11/1996 | Parker et al. |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,874,697 A | 2/1999 | Selker et al. |
| 5,926,170 A | 7/1999 | Oba |
| 5,957,191 A | 9/1999 | Okada et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,178,443 B1 | 1/2001 | Lin |
| 6,228,926 B1 | 5/2001 | Golumbic |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,506,983 B1 | 1/2003 | Babb et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 * | 4/2004 | Kono ............ G02F 1/13338 349/12 |
| 6,725,318 B1 | 4/2004 | Sherman et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,018,678 B2 | 3/2006 | Gronbeck et al. |
| 7,051,149 B2 | 5/2006 | Wang et al. |
| 7,083,295 B1 | 8/2006 | Hanna |
| 7,091,436 B2 | 8/2006 | Serban |
| 7,106,222 B2 | 9/2006 | Ward et al. |
| 7,123,292 B1 | 10/2006 | Seeger et al. |
| 7,169,460 B1 | 1/2007 | Chen et al. |
| 7,194,662 B2 | 3/2007 | Do et al. |
| 7,201,508 B2 | 4/2007 | Misaras |
| 7,213,991 B2 | 5/2007 | Chapman et al. |
| 7,224,830 B2 | 5/2007 | Nefian et al. |
| 7,277,087 B2 | 10/2007 | Hill et al. |
| 7,301,759 B2 | 11/2007 | Hsiung |
| 7,374,312 B2 | 5/2008 | Feng et al. |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,542,052 B2 | 6/2009 | Solomon et al. |
| 7,558,594 B2 | 7/2009 | Wilson |
| 7,559,834 B1 | 7/2009 | York |
| RE40,891 E | 9/2009 | Yasutake |
| 7,620,244 B1 | 11/2009 | Collier |
| 7,636,921 B2 | 12/2009 | Louie |
| 7,639,876 B2 | 12/2009 | Clary et al. |
| 7,656,392 B2 | 2/2010 | Bolender |
| 7,722,792 B2 | 5/2010 | Uezaki et al. |
| 7,728,923 B2 | 6/2010 | Kim et al. |
| 7,731,147 B2 | 6/2010 | Rha |
| 7,733,326 B1 | 6/2010 | Adiseshan |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,777,972 B1 | 8/2010 | Chen et al. |
| 7,782,342 B2 | 8/2010 | Koh |
| 7,813,715 B2 | 10/2010 | McKillop et al. |
| 7,815,358 B2 | 10/2010 | Inditsky |
| 7,822,338 B2 | 10/2010 | Wernersson |
| 7,865,639 B2 | 1/2011 | McCoy et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,936,501 B2 | 5/2011 | Smith et al. |
| 7,945,717 B2 | 5/2011 | Rivalsi |
| 7,970,246 B2 | 6/2011 | Travis et al. |
| 7,973,771 B2 | 7/2011 | Geaghan |
| 7,978,281 B2 | 7/2011 | Vergith et al. |
| 8,016,255 B2 | 9/2011 | Lin |
| 8,018,386 B2 | 9/2011 | Qi et al. |
| 8,018,579 B1 | 9/2011 | Krah |
| 8,026,904 B2 | 9/2011 | Westerman |
| 8,053,688 B2 | 11/2011 | Conzola et al. |
| 8,065,624 B2 | 11/2011 | Morin et al. |
| 8,069,356 B2 | 11/2011 | Rathi et al. |
| 8,077,160 B2 | 12/2011 | Land et al. |
| 8,090,885 B2 | 1/2012 | Callaghan et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,189,973 B2 | 5/2012 | Travis et al. |
| 8,226,259 B2 * | 7/2012 | Van Pieterson ...... G02B 6/0055 362/103 |
| 8,229,509 B2 | 7/2012 | Paek et al. |
| 8,229,522 B2 | 7/2012 | Kim et al. |
| 8,248,791 B2 | 8/2012 | Wang et al. |
| 8,255,708 B1 | 8/2012 | Zhang |
| 8,263,730 B2 | 9/2012 | Shimizu |
| 8,267,368 B2 | 9/2012 | Torii et al. |
| 8,274,784 B2 | 9/2012 | Franz et al. |
| 8,279,589 B2 | 10/2012 | Kim |
| 8,322,290 B1 | 12/2012 | Mignano |
| 8,389,078 B2 | 3/2013 | Lin et al. |

(56) References Cited

U.S. PATENT DOCUMENTS

| | | | |
|---|---|---|---|
| 8,416,559 B2 | 4/2013 | Agata et al. | |
| 8,498,100 B1 | 7/2013 | Whitt, III et al. | |
| 8,543,227 B1 | 9/2013 | Perek et al. | |
| 8,548,608 B2 | 10/2013 | Perek et al. | |
| 8,564,944 B2 | 10/2013 | Whitt, III et al. | |
| 8,570,725 B2 | 10/2013 | Whitt, III et al. | |
| 8,582,280 B2 | 11/2013 | Ryu | |
| 8,610,015 B2 | 12/2013 | Whitt et al. | |
| 8,614,666 B2 | 12/2013 | Whitman et al. | |
| 8,646,999 B2 | 2/2014 | Shaw et al. | |
| 8,654,030 B1 | 2/2014 | Mercer | |
| 2002/0134828 A1 | 9/2002 | Sandbach et al. | |
| 2002/0163510 A1 | 11/2002 | Williams et al. | |
| 2003/0132916 A1 | 7/2003 | Kramer | |
| 2003/0163611 A1 | 8/2003 | Nagao | |
| 2003/0197687 A1 | 10/2003 | Shetter | |
| 2004/0048941 A1 | 3/2004 | Raffel et al. | |
| 2004/0100457 A1 | 5/2004 | Mandle | |
| 2004/0258924 A1 | 12/2004 | Berger et al. | |
| 2004/0268000 A1 | 12/2004 | Barker et al. | |
| 2005/0030728 A1 | 2/2005 | Kawashima et al. | |
| 2005/0042013 A1* | 2/2005 | Lee | G06F 1/1613 400/490 |
| 2005/0057515 A1 | 3/2005 | Bathiche | |
| 2005/0059489 A1 | 3/2005 | Kim | |
| 2005/0134717 A1 | 6/2005 | Misawa | |
| 2005/0146512 A1 | 7/2005 | Hill et al. | |
| 2005/0264653 A1 | 12/2005 | Starkweather et al. | |
| 2005/0264988 A1 | 12/2005 | Nicolosi | |
| 2005/0285703 A1 | 12/2005 | Wheeler et al. | |
| 2006/0049993 A1 | 3/2006 | Lin et al. | |
| 2006/0061555 A1 | 3/2006 | Mullen | |
| 2006/0085658 A1 | 4/2006 | Allen et al. | |
| 2006/0102914 A1 | 5/2006 | Smits et al. | |
| 2006/0125799 A1 | 6/2006 | Hillis et al. | |
| 2006/0132423 A1 | 6/2006 | Travis | |
| 2006/0154029 A1 | 7/2006 | Antonini | |
| 2006/0154725 A1 | 7/2006 | Glaser et al. | |
| 2006/0156415 A1 | 7/2006 | Rubinstein et al. | |
| 2006/0181514 A1 | 8/2006 | Newman | |
| 2006/0187216 A1 | 8/2006 | Trent, Jr. et al. | |
| 2006/0195522 A1 | 8/2006 | Miyazaki | |
| 2006/0197755 A1 | 9/2006 | Bawany | |
| 2006/0238510 A1 | 10/2006 | Panotopoulos et al. | |
| 2006/0254042 A1 | 11/2006 | Chou et al. | |
| 2007/0047221 A1 | 3/2007 | Park | |
| 2007/0056385 A1 | 3/2007 | Lorenz | |
| 2007/0062089 A1 | 3/2007 | Homer et al. | |
| 2007/0069153 A1 | 3/2007 | Pai-Paranjape et al. | |
| 2007/0072474 A1 | 3/2007 | Beasley et al. | |
| 2007/0116929 A1 | 5/2007 | Fujimori et al. | |
| 2007/0145945 A1 | 6/2007 | McGinley et al. | |
| 2007/0182663 A1 | 8/2007 | Biech | |
| 2007/0182722 A1 | 8/2007 | Hotelling et al. | |
| 2007/0188478 A1 | 8/2007 | Silverstein et al. | |
| 2007/0200830 A1 | 8/2007 | Yamamoto | |
| 2007/0220708 A1 | 9/2007 | Lewis | |
| 2007/0234420 A1 | 10/2007 | Novotney et al. | |
| 2007/0236408 A1 | 10/2007 | Yamaguchi et al. | |
| 2007/0236475 A1 | 10/2007 | Wherry | |
| 2007/0247338 A1 | 10/2007 | Marchetto | |
| 2007/0247432 A1 | 10/2007 | Oakley | |
| 2007/0260892 A1 | 11/2007 | Paul et al. | |
| 2007/0274094 A1 | 11/2007 | Schultz et al. | |
| 2007/0274095 A1 | 11/2007 | Destain | |
| 2007/0283179 A1 | 12/2007 | Burnett et al. | |
| 2008/0005423 A1 | 1/2008 | Jacobs et al. | |
| 2008/0013809 A1 | 1/2008 | Zhu et al. | |
| 2008/0030937 A1 | 2/2008 | Russo et al. | |
| 2008/0104437 A1 | 5/2008 | Lee | |
| 2008/0151478 A1 | 6/2008 | Chern | |
| 2008/0158185 A1 | 7/2008 | Westerman | |
| 2008/0167832 A1 | 7/2008 | Soss | |
| 2008/0174570 A1 | 7/2008 | Jobs et al. | |
| 2008/0180411 A1 | 7/2008 | Solomon et al. | |
| 2008/0219025 A1 | 9/2008 | Spitzer et al. | |
| 2008/0228969 A1 | 9/2008 | Cheah et al. | |
| 2008/0232061 A1 | 9/2008 | Wang et al. | |
| 2008/0233326 A1 | 9/2008 | Hegemier et al. | |
| 2008/0238884 A1 | 10/2008 | Harish | |
| 2008/0253822 A1 | 10/2008 | Matias | |
| 2008/0309636 A1 | 12/2008 | Feng et al. | |
| 2008/0316002 A1 | 12/2008 | Brunet et al. | |
| 2008/0320190 A1 | 12/2008 | Lydon et al. | |
| 2009/0007001 A1 | 1/2009 | Morin et al. | |
| 2009/0009476 A1 | 1/2009 | Daley, III | |
| 2009/0073060 A1 | 3/2009 | Shimasaki et al. | |
| 2009/0073957 A1 | 3/2009 | Newland et al. | |
| 2009/0079639 A1 | 3/2009 | Hotta et al. | |
| 2009/0083562 A1 | 3/2009 | Park et al. | |
| 2009/0127005 A1 | 5/2009 | Zachut et al. | |
| 2009/0140985 A1 | 6/2009 | Liu | |
| 2009/0163147 A1 | 6/2009 | Steigerwald et al. | |
| 2009/0167728 A1 | 7/2009 | Geaghan et al. | |
| 2009/0195497 A1 | 8/2009 | Fitzgerald et al. | |
| 2009/0231275 A1 | 9/2009 | Odgers | |
| 2009/0251008 A1 | 10/2009 | Sugaya | |
| 2009/0259865 A1 | 10/2009 | Sheynblat et al. | |
| 2009/0262492 A1 | 10/2009 | Whitchurch et al. | |
| 2009/0265670 A1 | 10/2009 | Kim et al. | |
| 2009/0303137 A1 | 12/2009 | Kusaka et al. | |
| 2009/0303204 A1 | 12/2009 | Nasiri et al. | |
| 2009/0320244 A1 | 12/2009 | Lin | |
| 2009/0321490 A1 | 12/2009 | Groene et al. | |
| 2010/0001963 A1 | 1/2010 | Doray et al. | |
| 2010/0013319 A1 | 1/2010 | Kamiyama et al. | |
| 2010/0026656 A1 | 2/2010 | Hotelling et al. | |
| 2010/0038821 A1 | 2/2010 | Jenkins et al. | |
| 2010/0045609 A1 | 2/2010 | Do et al. | |
| 2010/0045633 A1 | 2/2010 | Gettemy et al. | |
| 2010/0051356 A1 | 3/2010 | Stern et al. | |
| 2010/0051432 A1 | 3/2010 | Lin et al. | |
| 2010/0053534 A1 | 3/2010 | Hsieh et al. | |
| 2010/0077237 A1 | 3/2010 | Sawyers | |
| 2010/0081377 A1 | 4/2010 | Chatterjee et al. | |
| 2010/0085321 A1 | 4/2010 | Pundsack | |
| 2010/0102182 A1 | 4/2010 | Lin | |
| 2010/0103112 A1 | 4/2010 | Yoo et al. | |
| 2010/0123686 A1 | 5/2010 | Klinghult et al. | |
| 2010/0133398 A1 | 6/2010 | Chiu et al. | |
| 2010/0142130 A1 | 6/2010 | Wang et al. | |
| 2010/0149111 A1 | 6/2010 | Olien | |
| 2010/0149134 A1 | 6/2010 | Westerman et al. | |
| 2010/0149377 A1 | 6/2010 | Shintani et al. | |
| 2010/0156798 A1 | 6/2010 | Archer | |
| 2010/0161522 A1 | 6/2010 | Tirpak et al. | |
| 2010/0164857 A1 | 7/2010 | Liu et al. | |
| 2010/0164870 A1* | 7/2010 | Kunthady | H01H 13/704 345/168 |
| 2010/0171891 A1 | 7/2010 | Kaji et al. | |
| 2010/0174421 A1 | 7/2010 | Tsai et al. | |
| 2010/0180063 A1 | 7/2010 | Ananny et al. | |
| 2010/0188299 A1 | 7/2010 | Rinehart et al. | |
| 2010/0188338 A1 | 7/2010 | Longe | |
| 2010/0206614 A1 | 8/2010 | Park et al. | |
| 2010/0206644 A1 | 8/2010 | Yeh | |
| 2010/0214214 A1 | 8/2010 | Corson et al. | |
| 2010/0214257 A1 | 8/2010 | Wussler et al. | |
| 2010/0222110 A1 | 9/2010 | Kim et al. | |
| 2010/0231498 A1 | 9/2010 | Large et al. | |
| 2010/0231510 A1 | 9/2010 | Sampsell et al. | |
| 2010/0231556 A1 | 9/2010 | Mines et al. | |
| 2010/0238075 A1 | 9/2010 | Pourseyed | |
| 2010/0238138 A1 | 9/2010 | Goertz et al. | |
| 2010/0245221 A1 | 9/2010 | Khan | |
| 2010/0250988 A1 | 9/2010 | Okuda et al. | |
| 2010/0274932 A1 | 10/2010 | Kose | |
| 2010/0279768 A1 | 11/2010 | Huang et al. | |
| 2010/0289457 A1 | 11/2010 | Onnerud et al. | |
| 2010/0291331 A1 | 11/2010 | Schaefer | |
| 2010/0295812 A1 | 11/2010 | Burns et al. | |
| 2010/0302378 A1 | 12/2010 | Marks et al. | |
| 2010/0304793 A1 | 12/2010 | Kim | |
| 2010/0306538 A1 | 12/2010 | Thomas et al. | |

(56) References Cited

U.S. PATENT DOCUMENTS

| | | |
|---|---|---|
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321339 A1 | 12/2010 | Kimmel |
| 2010/0325155 A1 | 12/2010 | Skinner et al. |
| 2010/0331059 A1 | 12/2010 | Apgar et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102356 A1 | 5/2011 | Kemppinen et al. |
| 2011/0115747 A1 | 5/2011 | Powell et al. |
| 2011/0134032 A1 | 6/2011 | Chiu et al. |
| 2011/0134112 A1 | 6/2011 | Koh et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0183120 A1 | 7/2011 | Sharygin et al. |
| 2011/0184646 A1 | 7/2011 | Wong et al. |
| 2011/0193787 A1 | 8/2011 | Morishige et al. |
| 2011/0193938 A1 | 8/2011 | Oderwald et al. |
| 2011/0202878 A1 | 8/2011 | Park et al. |
| 2011/0205372 A1 | 8/2011 | Miramontes |
| 2011/0216266 A1 | 9/2011 | Travis |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0242138 A1 | 10/2011 | Tribble |
| 2011/0248152 A1 | 10/2011 | Svajda et al. |
| 2011/0248920 A1 | 10/2011 | Larsen |
| 2011/0248941 A1 | 10/2011 | Abdo et al. |
| 2011/0261001 A1 | 10/2011 | Liu |
| 2011/0261083 A1 | 10/2011 | Wilson |
| 2011/0267272 A1 | 11/2011 | Meyer et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0304577 A1 | 12/2011 | Brown |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0013490 A1 * | 1/2012 | Pance .................. G06F 3/0202 341/28 |
| 2012/0013519 A1 | 1/2012 | Hakansson et al. |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0075249 A1 | 3/2012 | Hoch |
| 2012/0081316 A1 | 4/2012 | Sirpal et al. |
| 2012/0087078 A1 | 4/2012 | Medica et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0103778 A1 | 5/2012 | Obata et al. |
| 2012/0113579 A1 | 5/2012 | Agata et al. |
| 2012/0115553 A1 | 5/2012 | Mahe et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0175487 A1 | 7/2012 | Goto |
| 2012/0182242 A1 | 7/2012 | Lindahl et al. |
| 2012/0194393 A1 | 8/2012 | Uttermann et al. |
| 2012/0194448 A1 | 8/2012 | Rothkopf |
| 2012/0200802 A1 | 8/2012 | Large |
| 2012/0206937 A1 | 8/2012 | Travis et al. |
| 2012/0223866 A1 | 9/2012 | Ayala Vazquez et al. |
| 2012/0224073 A1 | 9/2012 | Miyahara |
| 2012/0227259 A1 | 9/2012 | Badaye et al. |
| 2012/0235635 A1 | 9/2012 | Sato |
| 2012/0246377 A1 | 9/2012 | Bhesania |
| 2012/0256959 A1 | 10/2012 | Ye et al. |
| 2012/0274811 A1 | 11/2012 | Bakin |
| 2012/0298491 A1 | 11/2012 | Ozias et al. |
| 2012/0300275 A1 | 11/2012 | Vilardell et al. |
| 2012/0312955 A1 | 12/2012 | Randolph |
| 2013/0009413 A1 | 1/2013 | Chiu et al. |
| 2013/0044059 A1 * | 2/2013 | Fu ..................... G06F 3/04886 345/168 |
| 2013/0059117 A1 | 3/2013 | Hill |
| 2013/0063873 A1 | 3/2013 | Wodrich et al. |
| 2013/0076635 A1 | 3/2013 | Lin |
| 2013/0088431 A1 | 4/2013 | Ballagas et al. |
| 2013/0106766 A1 | 5/2013 | Yilmaz et al. |
| 2013/0207937 A1 | 8/2013 | Lutian et al. |
| 2013/0227836 A1 | 9/2013 | Whitt, III et al. |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228435 A1 | 9/2013 | Whitt, III |
| 2013/0228439 A1 | 9/2013 | Whitt, III |
| 2013/0229100 A1 | 9/2013 | Siddiqui |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229356 A1 | 9/2013 | Marwah |
| 2013/0229363 A1 | 9/2013 | Whitman |
| 2013/0229366 A1 | 9/2013 | Dighde |
| 2013/0229380 A1 | 9/2013 | Lutz, III |
| 2013/0229386 A1 | 9/2013 | Bathiche |
| 2013/0229534 A1 | 9/2013 | Panay |
| 2013/0229568 A1 | 9/2013 | Belesiu |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler |
| 2013/0232353 A1 | 9/2013 | Belesiu |
| 2013/0232571 A1 | 9/2013 | Belesiu |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0322000 A1 | 12/2013 | Whitt |
| 2013/0322001 A1 | 12/2013 | Whitt |
| 2013/0332628 A1 | 12/2013 | Panay |
| 2013/0335330 A1 | 12/2013 | Lane |
| 2013/0335902 A1 | 12/2013 | Campbell |
| 2013/0335903 A1 | 12/2013 | Raken |
| 2013/0342465 A1 | 12/2013 | Bathiche |
| 2013/0346636 A1 | 12/2013 | Bathiche |
| 2014/0012401 A1 | 1/2014 | Perek |
| 2014/0022177 A1 | 1/2014 | Shaw |
| 2015/0228105 A1 | 8/2015 | Harley, Jr. et al. |

(56) References Cited

U.S. PATENT DOCUMENTS

FOREIGN PATENT DOCUMENTS

| | | |
|---|---|---|
| EP | 1591891 | 11/2005 |
| EP | 2353978 | 8/2011 |
| GB | 2123213 | 1/1984 |
| GB | 2178570 | 2/1987 |
| JP | 56108127 | 8/1981 |
| JP | 10326124 | 12/1998 |
| JP | 1173239 | 3/1999 |
| JP | 2006294361 | 10/2006 |
| KR | 1020110087178 | 8/2011 |
| NL | 1038411 | 5/2012 |
| WO | WO-9108915 | 6/1991 |
| WO | WO-9414587 | 7/1994 |
| WO | WO-03106134 | 12/2003 |
| WO | WO-2005027696 | 3/2005 |
| WO | WO-2006044818 | 4/2006 |
| WO | WO-2010011983 | 1/2010 |
| WO | WO-2013012699 | 1/2013 |
| WO | WO-2013033067 | 3/2013 |

OTHER PUBLICATIONS

"Non-Final Office Action", U.S. Appl. No. 13/653,218, Mar. 4, 2015, 16 pages.
"Restriction Requirement", U.S. Appl. No. 13/653,218, Nov. 7, 2014, 6 pages.
Nablo, "Transfer Coating by Electron Initiated Polymerization", Radiation Physics and Chemistry, Pergamon Press, Oxford, GB vol. 25, No. 4-6 ISSN:0146-5724, Jan. 1, 1985.
"Accessing Device Sensors", retrieved from <https://developer.palm.com/content/api/dev-guide/pdk/accessing-device-sensors.html> on May 25, 2012, 2011, 4 pages.
"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.
"Advanced Configuration and Power Management Specification", Intel Corporation, Microsoft Corporation, Toshiba Corp. Revision 1, Dec. 22, 1996, 364 pages.
"Cholesteric Liquid Crystal", Retrieved from: <http://en.wikipedia.org/wiki/Cholesteric_liquid_crystal> on Aug. 6, 2012, Jun. 10, 2012, 2 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.
"Corrected Notice of Allowance", U.S. Appl. No. 13/470,633, Apr. 9, 2013, 2 pages.
"Corrected Notice of Allowance", U.S. Appl. No. 13/470,633, Jul. 2, 2013, 2 pages.
"Corrected Notice of Allowance", U.S. Appl. No. 13/563,435, Jan. 14, 2014, 2 pages.
"Corrected Notice of Allowance", U.S. Appl. No. 13/563,435, Jan. 22, 2014, 2 pages.
"Corrected Notice of Allowance", U.S. Appl. No. 13/651,327, Sep. 12, 2013, 2 pages.
"Corrected Notice of Allowance", U.S. Appl. No. 13/651,327, Sep. 23, 2013, 2 pages.
"Corrected Notice of Allowance", U.S. Appl. No. 13/651,726, Sep. 17, 2013, 2 pages.
"Corrected Notice of Allowance", U.S. Appl. No. 13/656,520, Jan. 16, 2014, 3 pages.
"Developing Next-Generation Human Interfaces using Capacitive and Infrared Proximity Sensing", Silicon Laboratories, Inc., Available at <http://www.silabs.com/pages/DownloadDoc.aspx?FILEURL=support%20documents/technicaldocs/capacitive%20and%20proximity%20sensing_wp.pdf&src=SearchResults>, Aug. 30, 2010, pp. 1-10.

"Directional Backlighting for Display Panels", U.S. Appl. No. 13/021,448, Feb. 4, 2011, 38 pages.
"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.
"Final Office Action", U.S. Appl. No. 13/471,001, Jul. 25, 2013, 20 pages.
"Final Office Action", U.S. Appl. No. 13/471,139, Sep. 16, 2013, 13 pages.
"Final Office Action", U.S. Appl. No. 13/471,336, Aug. 28, 2013, 18 pages.
"Final Office Action", U.S. Appl. No. 13/651,195, Apr. 18, 2013, 13 pages.
"Final Office Action", U.S. Appl. No. 13/651,232, May 21, 2013, 21 pages.
"Final Office Action", U.S. Appl. No. 13/651,287, May 3, 2013, 16 pages.
"Final Office Action", U.S. Appl. No. 13/651,976, Jul. 25, 2013, 21 pages.
"Final Office Action", U.S. Appl. No. 13/653,321, Aug. 2, 2013, 17 pages.
"Final Office Action", U.S. Appl. No. 13/653,682, Oct. 18, 2013, 16 pages.
"Final Office Action", U.S. Appl. No. 13/656,055, Oct. 23, 2013, 14 pages.
"Final Office Action", U.S. Appl. No. 13/938,930, Nov. 8, 2013, 10 pages.
"Final Office Action", U.S. Appl. No. 13/939,002, Nov. 8, 2013, 7 pages.
"Final Office Action", U.S. Appl. No. 13/939,032, Dec. 20, 2013, 5 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Office Action", CN Application No. 201320097066.8, Oct. 24, 2013, 5 Pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"How to Use the iPad's Onscreen Keyboard", Retrieved from <http://www.dummies.com/how-to/content/how-to-use-the-ipads-onscreen-keyboard.html> on Aug. 28, 2012, 2012, 3 pages.
"i-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.
"International Search Report and Written Opinion", Application No. PCT/US2013/028948, Jun. 21, 2013, 11 pages.
"International Search Report and Written Opinion", Application No. PCT/US2013/029461, Jun. 21, 2013, 11 pages.
"International Search Report and Written Opinion", Application No. PCT/US2013/044871, Aug. 14, 2013, 12 pages.
"International Search Report and Written Opinion", Application No. PCT/US2013/040968, Sep. 5, 2013, 12 pages.
"International Search Report and Written Opinion", Application No. PCT/US2013/042550, Sep. 24, 2013, 14 pages.
"International Search Report and Written Opinion", Application No. PCT/US2013/045049, Sep. 16, 2013, 9 pages.
"Membrane Keyboards & Membrane Keypads", Retrieved from: <http://www.pannam.com/> on May 9, 2012, Mar. 4, 2009, 2 pages.
"Motion Sensors", Android Developers—retrieved from <http://developer.android.com/guide/topics/sensors/sensors_motion.html> on May 25, 2012, 2012, 7 pages.

(56) References Cited

OTHER PUBLICATIONS

"MPC Fly Music Production Controller", AKAI Professional, Retrieved from: <http://www.akaiprompc.com/mpc-fly> on Jul. 9, 2012, 4 pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/021,448, Dec. 13, 2012, 9 pages.
"Non-Final Office Action", U.S. Appl. No. 13/371,725, Nov. 7, 2013, 19 pages.
"Non-Final Office Action", U.S. Appl. No. 13/468,918, Dec. 26, 2013, 18 pages.
"Non-Final Office Action", U.S. Appl. No. 13/471,001, Feb. 19, 2013, 15 pages.
"Non-Final Office Action", U.S. Appl. No. 13/471,139, Mar. 21, 2013, 12 pages.
"Non-Final Office Action", U.S. Appl. No. 13/471,202, Feb. 11, 2013, 10 pages.
"Non-Final Office Action", U.S. Appl. No. 13/471,336, Jan. 18, 2013, 14 pages.
"Non-Final Office Action", U.S. Appl. No. 13/527,263, Jul. 19, 2013, 5 pages.
"Non-Final Office Action", U.S. Appl. No. 13/563,435, Jun. 14, 2013, 6 pages.
"Non-Final Office Action", U.S. Appl. No. 13/564,520, Jun. 19, 2013, 8 pages.
"Non-Final Office Action", U.S. Appl. No. 13/565,124, Jun. 17, 2013, 5 pages.
"Non-Final Office Action", U.S. Appl. No. 13/603,918, Dec. 19, 2013, 12 pages.
"Non-Final Office Action", U.S. Appl. No. 13/651,195, Jan. 2, 2013, 14 pages.
"Non-Final Office Action", U.S. Appl. No. 13/651,232, Jan. 17, 2013, 15 pages.
"Non-Final Office Action", U.S. Appl. No. 13/651,232, Dec. 5, 2013, 15 pages.
"Non-Final Office Action", U.S. Appl. No. 13/651,272, Feb. 12, 2013, 10 pages.
"Non-Final Office Action", U.S. Appl. No. 13/651,287, Jan. 29, 2013, 13 pages.
"Non-Final Office Action", U.S. Appl. No. 13/651,304, Mar. 22, 2013, 9 pages.
"Non-Final Office Action", U.S. Appl. No. 13/651,327, Mar. 22, 2013, 6 pages.
"Non-Final Office Action", U.S. Appl. No. 13/651,726, Apr. 15, 2013, 6 pages.
"Non-Final Office Action", U.S. Appl. No. 13/651,871, Mar. 18, 2013, 14 pages.
"Non-Final Office Action", U.S. Appl. No. 13/651,871, Jul. 1, 2013, 5 pages.
"Non-Final Office Action", U.S. Appl. No. 13/651,976, Feb. 22, 2013, 16 pages.
"Non-Final Office Action", U.S. Appl. No. 13/653,321, Feb. 1, 2013, 13 pages.
"Non-Final Office Action", U.S. Appl. No. 13/653,682, Feb. 7, 2013, 11 pages.
"Non-Final Office Action", U.S. Appl. No. 13/653,682, Jun. 3, 2013, 14 pages.
"Non-Final Office Action", U.S. Appl. No. 13/656,055, Apr. 23, 2013, 11 pages.
"Non-Final Office Action", U.S. Appl. No. 13/656,520, Feb. 1, 2013, 15 pages.
"Non-Final Office Action", U.S. Appl. No. 13/656,520, Jun. 5, 2013, 8 pages.
"Non-Final Office Action", U.S. Appl. No. 13/780,228, Oct. 30, 2013, 12 pages.
"Non-Final Office Action", U.S. Appl. No. 13/938,930, Aug. 29, 2013, 9 pages.
"Non-Final Office Action", U.S. Appl. No. 13/939,002, Aug. 28, 2013, 6 pages.
"Non-Final Office Action", U.S. Appl. No. 13/939,002, Dec. 20, 2013, 5 pages.
"Non-Final Office Action", U.S. Appl. No. 13/939,032, Aug. 29, 2013, 7 pages.
"Non-Final Office Action", U.S. Appl. No. 14/063,912, Jan. 2, 2014, 10 pages.
"Notice of Allowance", U.S. Appl. No. 13/470,633, Mar. 22, 2013, 7 pages.
"Notice of Allowance", U.S. Appl. No. 13/471,202, May 28, 2013, 7 pages.
"Notice of Allowance", U.S. Appl. No. 13/563,435, Nov. 12, 2013, 5 pages.
"Notice of Allowance", U.S. Appl. No. 13/565,124, Dec. 24, 2013, 6 pages.
"Notice of Allowance", U.S. Appl. No. 13/651,195, Jul. 8, 2013, 9 pages.
"Notice of Allowance", U.S. Appl. No. 13/651,272, May 2, 2013, 7 pages.
"Notice of Allowance", U.S. Appl. No. 13/651,304, Jul. 1, 2013, 5 pages.
"Notice of Allowance", U.S. Appl. No. 13/651,327, Jun. 11, 2013, 7 pages.
"Notice of Allowance", U.S. Appl. No. 13/651,726, May 31, 2013, 5 pages.
"Notice of Allowance", U.S. Appl. No. 13/651,871, Oct. 2, 2013, 7 pages.
"Notice of Allowance", U.S. Appl. No. 13/653,321, Dec. 18, 2013, 4 pages.
"Notice of Allowance", U.S. Appl. No. 13/656,520, Oct. 2, 2013, 5 pages.
"Notice of Allowance", U.S. Appl. No. 13/715,133, Jan. 6, 2014, 7 pages.
"Notice to Grant", CN Application No. 201320097089.9, 09/29/13, 2 Pages.
"Notice to Grant", CN Application No. 201320097124.7, Oct. 8, 2013, 2 pages.
"On-Screen Keyboard for Windows 7, Vista, XP with Touchscreen", Retrieved from <www.comfort-software.com/on-screen-keyboard.html> on Aug. 28, 2012, Feb. 2, 2011, 3 pages.
"Optical Sensors in Smart Mobile Devices", ON Semiconductor, TND415/D, Available at <http://www.onsemi.jp/pub_link/Collateral/TND415-D.PDF>,Nov. 2010, pp. 1-13.
"Optics for Displays: Waveguide-based Wedge Creates Collimated Display Backlight", OptoIQ, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010,Jan. 1, 2010, 3 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, Nov. 29, 2013, 6 pages.
"Restriction Requirement", U.S. Appl. No. 13/603,918, Nov. 27, 2013, 8 pages.
"Restriction Requirement", U.S. Appl. No. 13/715,133, Oct. 28, 2013, 6 pages.
"Restriction Requirement", U.S. Appl. No. 13/471,139, Jan. 17, 2013, 7 pages.
"Restriction Requirement", U.S. Appl. No. 13/651,304, Jan. 18, 2013, 7 pages.
"Restriction Requirement", U.S. Appl. No. 13/651,726, Feb. 22, 2013, 6 pages.
"Restriction Requirement", U.S. Appl. No. 13/651,871, Feb. 7, 2013, 6 pages.
"Restriction Requirement", U.S. Appl. No. 13/715,133, Dec. 3, 2013, 6 pages.

(56) References Cited

OTHER PUBLICATIONS

"Restriction Requirement", U.S. Appl. No. 13/715,229, Aug. 13, 2013, 7 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012, 2011, 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012,Nov. 22, 2012, 2 Pages.
"Write & Learn Spellboard Advanced", Available at <http://somemanuals.com/VTECH,WRITE%2526LEARN--SPELLBOARD--ADV--71000,JIDFHE.PDF>, 2006, 22 pages.
Bathiche, et al., "Input Device with Interchangeable Surface", U.S. Appl. No. 13/974,749, Aug. 23, 2013, 51 pages.
Block, et al., "DeviceOrientation Event Specification", W3C, Editor's Draft, retrieved from <https://developer.palm.com/content/api/dev-guide/pdk/accessing-device-sensors.html> on May 25, 2012,Jul. 12, 2011, 14 pages.
Brown, "Microsoft Shows Off Pressure-Sensitive Keyboard", retrieved from <http://news.cnet.com/8301-17938_105-10304792-1.html> on May 7, 2012, Aug. 6, 2009, 2 pages.
Butler, et al., "SideSight: Multi-"touch" Interaction around Small Devices", in the proceedings of the 21st annual ACM symposium on User interface software and technology., retrieved from <http://research.microsoft.com/pubs/132534/sidesight_crv3.pdf> on May 29, 2012,Oct. 19, 2008, 4 pages.
Crider, "Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das, et al., "Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz, et al., "A Practical Pressure Sensitive Computer Keyboard", in Proceedings of UIST 2009, Oct. 2009, 4 pages.
Gaver, et al., "A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012,May 7, 1995, 9 pages.
Glatt, "Channel and Key Pressure (Aftertouch).", Retrieved from: <http://home.roadrunner.com/~jgglatt/tutr/touch.htm> on Jun. 11, 2012, 2012, 2 pages.
Hanlon, "ElekTex Smart Fabric Keyboard Goes Wireless", Retrieved from: <http://www.gizmag.com/go/5048/ > on May 7, 2012, Jan. 15, 2006, 5 pages.
Harada, et al., "VoiceDraw: A Hands-Free Voice-Driven Drawing Application for People With Motor Impairments", in Proceedings of Ninth International ACM SIGACCESS Conference on Computers and Accessibility, retrieved from <http://citeseerx.ist.psu.edu/viewdoc/download?doi=10.1.1.113.7211&rep=rep1&type=pdf> on Jun. 1, 2012,Oct. 15, 2007, 8 pages.
Iwase, "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: Journal of Microelectromechanical Systems, Dec. 2005, 7 pages.
Kaufmann, et al., "Hand Posture Recognition Using Real-time Artificial Evolution", EvoApplications'09, retrieved from <http://evelyne.lutton.free.fr/Papers/KaufmannEvolASP2010.pdf> on Jan. 5, 2012,Apr. 3, 2010, 10 pages.
Kaur, "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong, et al., "Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Lance, et al., "Media Processing Input Device", U.S. Appl. No. 13/655,065, Oct. 18, 2012, 43 pages.
Li, et al., "Characteristic Mode Based Tradeoff Analysis of Antenna-Chassis Interactions for Multiple Antenna Terminals", in IEEE Transactions on Antennas and Propagation, Retrieved from <http://ieeexplore.ieee.org/stamp/stamp.jsp?tp=&arnumber=6060882>, Feb. 2012, 13 pages.
Linderholm, "Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
Manresa-Yee, et al., "Experiences Using a Hands-Free Interface", in Proceedings of the 10th International ACM SIGACCESS Conference on Computers and Accessibility, retrieved from <http://dmi.uib.es/~cmanresay/Research/%5BMan08%5DAssets08.pdf> on Jun. 1, 2012,Oct. 13, 2008, pp. 261-262.
McLellan, "Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
Nakanishi, et al., "Movable Cameras Enhance Social Telepresence in Media Spaces", in Proceedings of the 27th International Conference on Human Factors in Computing Systems, retrieved from <http://smg.ams.eng.osaka-u.ac.jp/~nakanishi/hnp_2009_chi.pdf> on Jun. 1, 2012,Apr. 6, 2009, 10 pages.
Piltch, "ASUS Eee Pad Slider SL101 Review", Retrieved from <http://www.laptopmag.com/review/tablets/asus-eee-pad-slider-sl101.aspx>, Sep. 22, 2011, 5 pages.
Post, et al., "E-Broidery: Design and Fabrication of Textile-Based Computing", IBM Systems Journal, vol. 39, Issue 3 & 4, Jul. 2000, pp. 840-860.
Prospero, "Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.
Purcher, "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012,Jan. 12, 2012, 15 pages.
Qin, et al., "pPen: Enabling Authenticated Pen and Touch Interaction on Tabletop Surfaces", in Proceedings of ITS 2010, Available at <http://www.dfki.de/its2010/papers/pdf/po172.pdf>,Nov. 2010, pp. 283-284.
Ramirez, "Applying Solventless Elastomeric Polyurethanes on Concrete in Wastewater Service", in Proceedings: Journal of Protective Coatings and Linings, May 1995, 13 pages.
Reilink, et al., "Endoscopic Camera Control by Head Movements for Thoracic Surgery", in Proceedings of 3rd IEEE RAS & EMBS International Conference of Biomedical Robotics and

(56) References Cited

OTHER PUBLICATIONS

Biomechatronics, retrieved from <http://doc.utwente.nl/74929/1/biorob_online.pdf> on Jun. 1, 2012,Sep. 26, 2010, pp. 510-515.

Sumimoto, "Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.

Sundstedt, "Gazing at Games: Using Eye Tracking to Control Virtual Characters", in ACM SIGGRAPH 2010 Courses, retrieved from <http://www.tobii.com/Global/Analysis/Training/EyeTrackAwards/veronica_sundstedt.pdf> on Jun. 1, 2012,Jul. 28, 2010, 85 pages.

Takamatsu, et al., "Flexible Fabric Keyboard with Conductive Polymer-Coated Fibers", in Proceedings of Sensors 2011, Oct. 28, 2011, 4 pages.

Travis, et al., "Collimated Light from a Waveguide for a Display Backlight", Optics Express, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009,Oct. 15, 2009, 6 pages.

Travis, et al., "The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.

Valli, "Notes on Natural Interaction", retrieved from <http://www.idemployee.id.tue.nl/g.w.m.rauterberg/lecturenotes/valli-2004.pdf> on Jan. 5, 2012, Sep. 2005, 80 pages.

Valliath, "Design of Hologram for Brightness Enhancement in Color LCDs", Retrieved from <http://www.loreti.it/Download/PDF/LCD/44_05.pdf> on Sep. 17, 2012, May 1998, 5 pages.

Vaucelle, "Scopemate, A Robotic Microscope!", Architectradure, retrieved from <http://architectradure.blogspot.com/2011/10/at-uist-this-monday-scopemate-robotic.html> on Jun. 6, 2012,Oct. 17, 2011, 2 pages.

Williams, "A Fourth Generation of LCD Backlight Technology", Retrieved from <http://cds.linear.com/docs/Application%20Note/an65f.pdf>, Nov. 1995, 124 pages.

Xu, et al., "Hand Gesture Recognition and Virtual Game Control Based on 3D Accelerometer and EMG Sensors", IUI'09, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf> on Jan. 5, 2012,Feb. 8, 2009, 5 pages.

Xu, et al., "Vision-based Detection of Dynamic Gesture", ICTM'09, Dec. 5-6, 2009, retrieved from <http://ieeexplore.ieee.org/stamp/stamp.jsp?tp=&arnumber=5412956> on Jan. 5, 2012,Dec. 5, 2009, pp. 223-226.

Zhang, et al., "Model-Based Development of Dynamically Adaptive Software", in Proceedings of ICSE 2006, Available at <http://www.irisa.fr/lande/lande/icse-proceedings/icse/p371.pdf>,May 20, 2006, pp. 371-380.

Zhu, et al., "Keyboard before Head Tracking Depresses User Success in Remote Camera Control", in Proceedings of 12th IFIP TC 13 International Conference on Human-Computer Interaction, Part II, retrieved from <http://csiro.academia.edu/Departments/CSIRO_ICT_Centre/Papers?page=5> on Jun. 1, 2012,Aug. 24, 2009, 14 pages.

"International Search Report and Written Opinion", Application No. PCT/US2015/014702, Jun. 22, 2015, 14 Pages.

"International Preliminary Report on Patentability", Application No. PCT/US2015/015083, May 20, 2016, 8 pages.

"International Preliminary Report on Patentability", Application No. PCT/US2015/014702, May 9, 2016, 9 pages.

"Non-Final Office Action", U.S. Appl. No. 13/653,218, Apr. 20, 2016, 17 pages.

"Final Office Action", U.S. Appl. No. 13/653,218, Oct. 5, 2015, 16 pages.

"Non-Final Office Action", U.S. Appl. No. 14/178,632, Sep. 21, 2016, 9 pages.

"Restriction Requirement", U.S. Appl. No. 14/178,632, Aug. 1, 2016, 7 pages.

"Non-Final Office Action", U.S. Appl. No. 14/178,632, Feb. 3, 2017, 10 pages.

"Notice of Allowance", U.S. Appl. No. 13/653,218, Mar. 10, 2017, 13 pages.

"Supplemental Notice of Allowance", U.S. Appl. No. 13/653,218, Apr. 7, 2017, 3 pages.

"Foreign Office Action", EP Application No. 15705467.7, Sep. 30, 2016, 2 pages.

"Restriction Requirement", U.S. Appl. No. 13/653,218, Oct. 21, 2016, 6 pages.

"Second Written Opinion", Application No. PCT/US2015/015803, dated Jan. 25, 2016, 7 pages.

"Second Written Opinion", Application No. PCT/US2015/014702, dated Jan. 19, 2016, 8 pages.

"Supplemental Notice of Allowance", U.S. Appl. No. 13/653,218, dated May 16, 2017, 2 pages.

"Supplemental Notice of Allowance", U.S. Appl. No. 13/653,218, dated Jun. 19, 2017, 2 pages.

* cited by examiner

900

902
Obtain a fabric layer having a textured surface formed by disposing a material on a textured release paper

904
Obtain a fabric layer having a smooth surface formed by disposing a material on a smooth release paper that is smoother than the textured release paper

906
Secure the fabric layers to each other such that the textured surface and the smooth surface are exposed

908
Form one or more portions in the secured fabric layers to permit transmission of light

910
Dispose the secured fabric layers proximal to a light guide such that light from the light guide is configured to pass through the one or more portions in the secured fabric layers

912
Form a device for use in conjunction with a computing device that includes the disposed secured fabric layers and light guide

Fig. 9

INPUT DEVICE OUTER LAYER AND BACKLIGHTING

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, however, the settings in which the mobile computing device may be used may vary greatly. For example, an amount of light in an environment surrounding the mobile computing device may also vary from setting to setting. Accordingly, techniques were developed to aid a user in such situations.

One example of this is the use of a backlight such that a user may view indications of available inputs of a computing device, e.g., indications of keys of a keyboard. However, techniques that have been developed to improve a "look and feel" of the computing device may not be compatible with conventional backlight techniques, such as those involving use of a fabric that permits a pinhole effect to be viewed by a user caused by light passing through holes in the fabric.

SUMMARY

Input device outer layer and backlighting techniques are described. In one or more implementations, an input device includes a light guide configured to transmit light, a sensor assembly having a plurality of sensors that are configured to detect proximity of an object as a corresponding one or more inputs, a connection portion configured to form a communicative coupling to a computing device to communicate the one or more inputs received by the sensor assembly to the computing device, and an outer layer disposed proximal to the light guide such that the light guide is positioned between the outer layer and the sensor assembly. The outer layer has one or more portions configured to permit transmission of light from the light guide to act as a backlight, the outer layer having a textured outer surface and a smooth inner surface that is disposed proximal to the light guide.

In one or more implementations, an apparatus includes a light guide configured to transmit light and an outer layer formed as a fabric and disposed proximal to the light guide. The outer layer has one or more portions configured to permit transmission of light from the light guide. The outer layer includes a fabric layer having a textured outer surface and a fabric layer having a smooth surface disposed proximal to the light guide and configured to have a resistance to transmission of light from the light guide that is greater than the fabric layer having the textured outer surface.

In one or more implementations, a fabric layer is obtained that has a textured surface formed by disposing a material on a textured release paper and a fabric layer is obtained that has a smooth surface formed by disposing a material on a smooth release paper that is smoother than the textured release paper. The fabric layers are secured to each other such that the textured surface and the smooth surface are exposed. One or more portions are formed in the secured fabric layers to permit transmission of light and the secured fabric layers are disposed proximal to a light guide such that light from the light guide is configured to pass through the one or more portions in the secured fabric layers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 9 is a flow diagram depicting a procedure in an example implementation in which a device is formed having an outer layer configured to support a backlight.

DETAILED DESCRIPTION

Overview

Mobile computing devices may be utilized in a wide variety of different scenarios due to their mobile construction, e.g., configured to be held by one or more hands of a user. As previously described, however, conventional techniques that were utilized to improve interaction with these mobile computing devices could be limited when confronted with other techniques that may also be employed for improving user interaction. For example, conventional use of fabrics to improve tactile response could suffer from a pinhole effect when used with a backlight due to "peaks and valleys" and other spaces in the fabrics that could cause light to leak through the fabric.

Accordingly, input device outer layer and backlight techniques are described. In one or more implementations, an input device is configured for use with a mobile computing device (e.g., tablet, mobile phone, and so on), such as a keyboard integrated into a cover that is removably connected to the mobile computing device. The input device may include a light guide that is configured to provide backlighting to indications of functions on a surface of the input device. For example, the light guide may be configured as a universal light guide such that different indications (e.g., legends) may be indicated on the surface of the input device to support different languages, configurations, and so on without reconfiguration of the light guide.

Additionally, the input device may be configured to reduce and even eliminate the "bleeding" of light through an outer surface of the input device, which may help support use of the universal light guide. This may include configuration of an outer layer of the input device to resist unwanted leakage of light through the outer layer. For example, the outer layer may be configured from a fabric layer having a desired texture. Another fabric layer have a smooth surface may be bonded to the textured fabric layer to increase resistance to light transmission through the layers. Further, different shades may also be used for the layers to further increase this resistance to light transmission through unwanted areas of the outer layer. In this way, a pinhole effect may be reduced and even eliminated for use as part of the input device. Further discussion of these and other techniques may be found in relation to the following sections.

In the following discussion, an example environment is first described that may employ the techniques described herein. Examples of layers that are usable in the example environment (i.e., the input device) are then described which may be performed in the example environment as well as other environments. Consequently, use of the example layers is not limited to the example environment and the example environment is not limited to use of the example layers.

Example Environment

Figure 1:
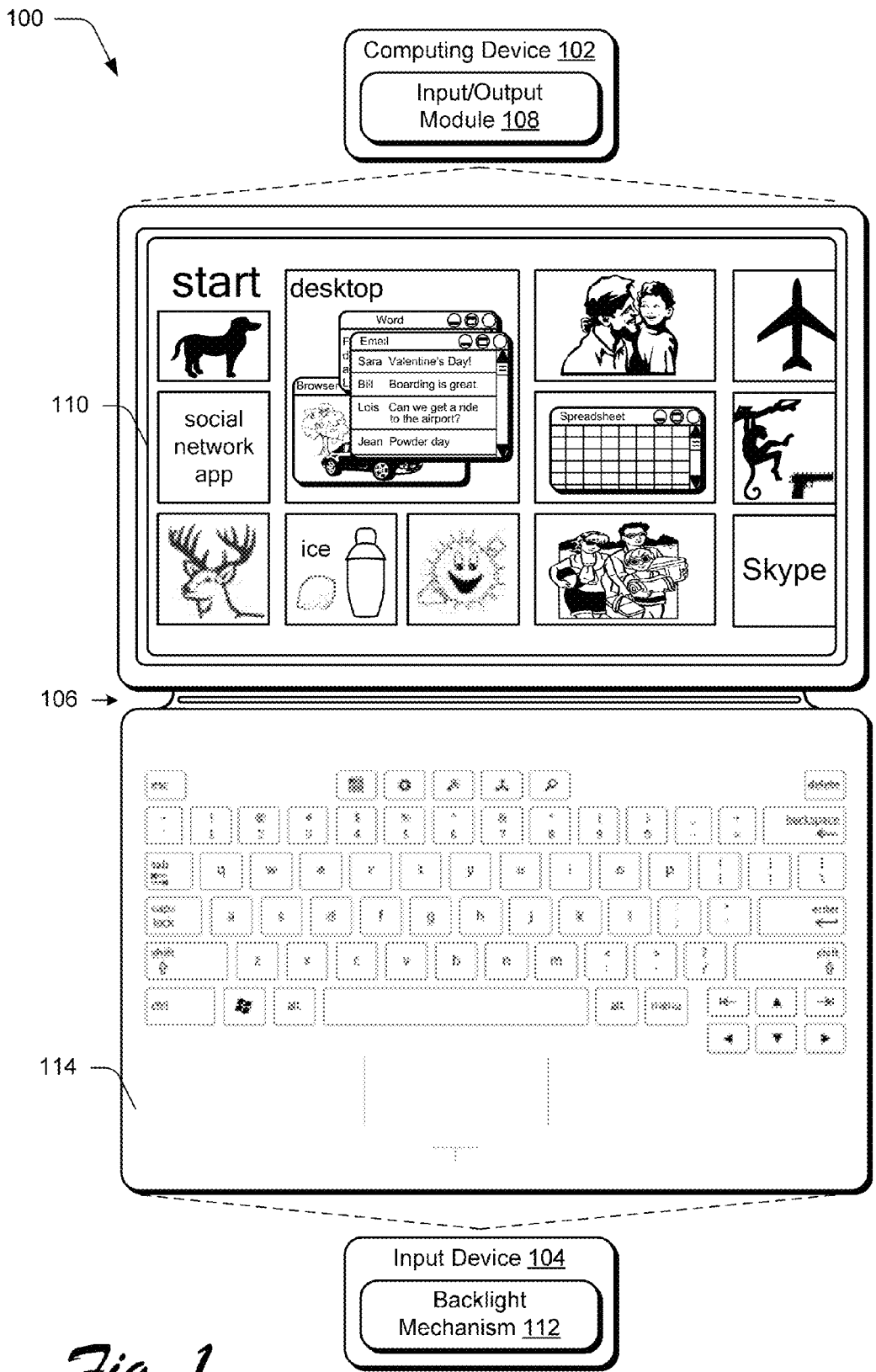
FIG. 1 is an illustration of an environment in an example implementation that is operable to employ the backlight techniques described herein.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on that is configured to be held by one or more hands of a user. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

The flexible hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, perform authentication, provide supplemental power to the computing device 102, and so on.

The input device 104 is also illustrated as including a backlight mechanism 112. The backlight mechanism 112 is representative of functionality that is configured to emit light from a surface of the input device 104, such as to illuminate indications of inputs (e.g., letters of the keyboard as well as a border of the keys, track pad, and so on). In this way, the indications may be viewed in low light conditions. Further, an outer layer 114 of the input device 104 may be configured to resist unwanted transmission of light from the backlight mechanism 112, such as to reduce a pinhole effect. The backlight mechanism 112 and the outer layer 114 may be implemented in a variety of ways, further discussion of which may be found beginning in relation to the discussion of FIG. 4 which follows further discussion of an example of the input device 104 as follows.

Figure 2:
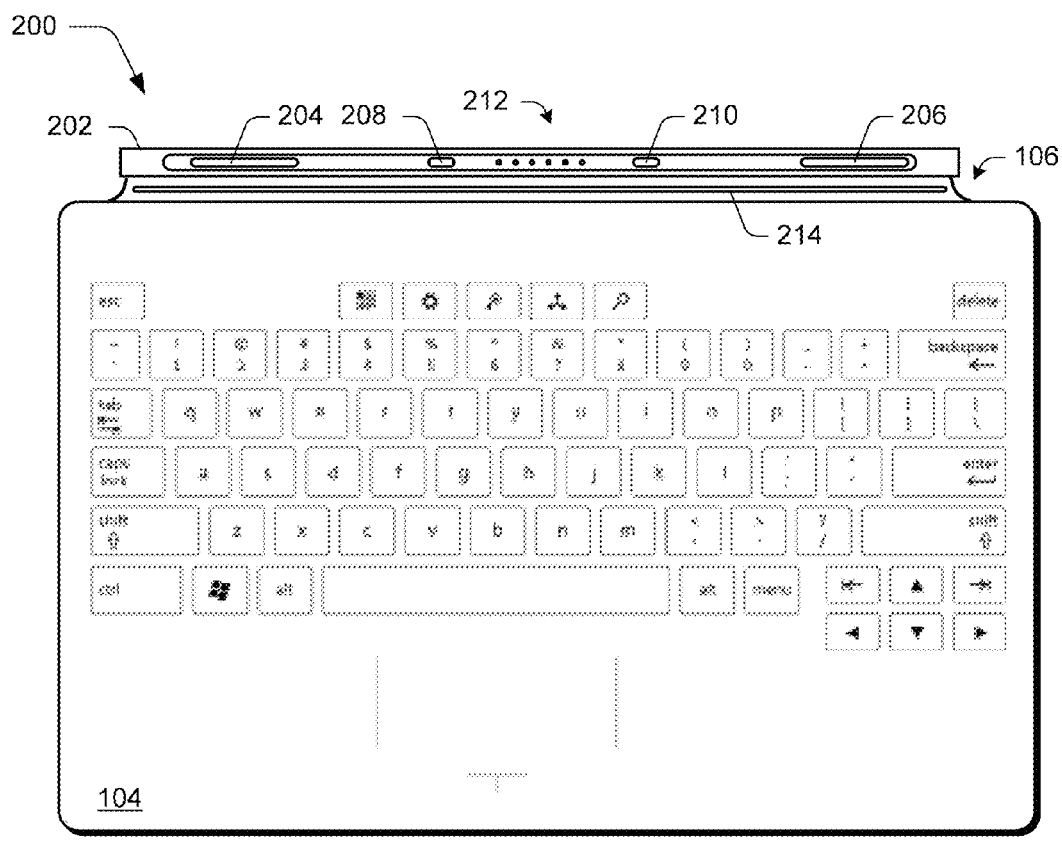
FIG. 2 depicts an example implementation of an input device of FIG. 1 as showing a flexible hinge in greater detail.

FIG. 2 depicts an example implementation 200 of the input device 104 of FIG. 1 as showing the flexible hinge 106 in greater detail. In this example, a connection portion 202 of the input device is shown that is configured to provide a communicative and physical connection between the input device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the input device 104 that includes the keys through use of the flexible hinge 106. Thus, when the connection portion 202 is physically connected to the computing device 102 the combination of the connection portion 202 and the flexible hinge 106 supports movement of the input device 104 in relation to the computing device 102 that is similar to a hinge of a book.

Through this rotational movement, a variety of different orientations of the input device 104 in relation to the computing device 102 may be supported. For example, rotational movement may be supported by the flexible hinge 106 such that the input device 104 may be placed against the display device 110 of the computing device 102 and thereby act as a cover. Thus, the input device 104 may act to protect the display device 110 of the computing device 102 from harm.

The connection portion 202 may be secured to the computing device in a variety of ways, an example of which is illustrated as including magnetic coupling devices 204, 206 (e.g., flux fountains), mechanical coupling protrusions 208, 210, and a plurality of communication contacts 212. The magnetic coupling devices 204, 206 are configured to magnetically couple to complementary magnetic coupling devices of the computing device 102 through use of one or more magnets. In this way, the input device 104 may be physically secured to the computing device 102 through use of magnetic attraction.

The connection portion 202 also includes mechanical coupling protrusions 208, 210 to form a mechanical physical connection between the input device 104 and the computing device 102. The mechanical coupling protrusions 208, 210 are shown in greater detail in relation to FIG. 3, which is discussed below.

Figure 3:
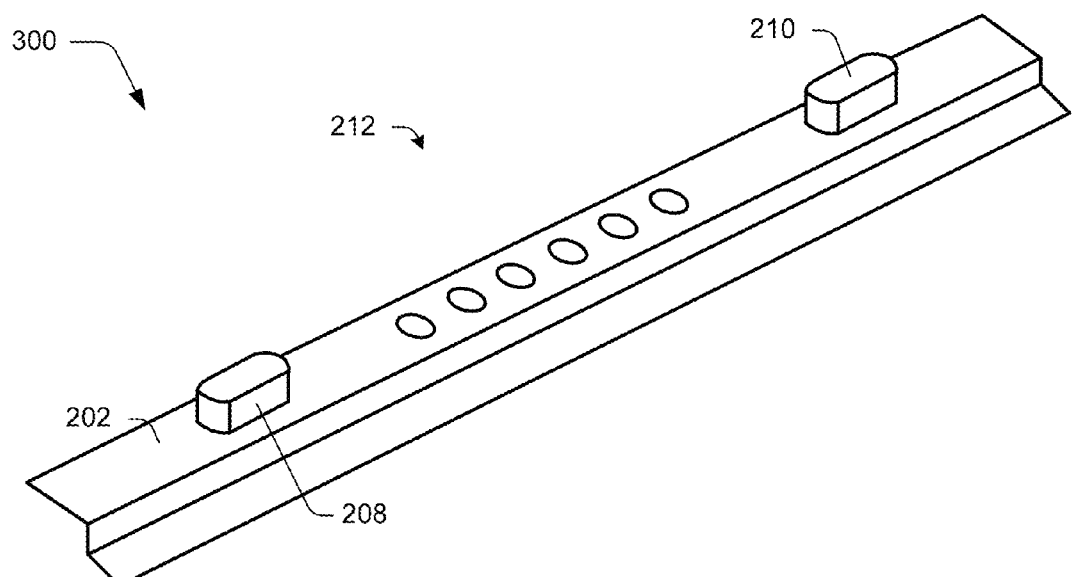
FIG. 3 depicts an example implementation showing a perspective view of a connection portion of FIG. 2 that includes mechanical coupling protrusions and a plurality of communication contacts.

FIG. 3 depicts an example implementation 300 showing a perspective view of the connection portion 202 of FIG. 2 that includes the mechanical coupling protrusions 208, 210 and the plurality of communication contacts 212. As illustrated, the mechanical coupling protrusions 208, 210 are configured to extend away from a surface of the connection portion 202, which in this case is perpendicular although other angles are also contemplated.

The mechanical coupling protrusions 208, 210 are configured to be received within complimentary cavities within the channel of the computing device 102. When so received, the mechanical coupling protrusions 208, 210 promote a mechanical binding between the devices when forces are applied that are not aligned with an axis that is defined as correspond to the height of the protrusions and the depth of the cavity.

The connection portion 202 is also illustrated as including a plurality of communication contacts 212. The plurality of communication contacts 212 is configured to contact corresponding communication contacts of the computing device 102 to form a communicative coupling between the devices as shown. The connection portion 202 may be configured in a variety of other ways, including use of a rotational hinge, mechanical securing device, and so on. In the following, an example of a docking apparatus 112 is described and shown in a corresponding figure.

Figure 4:
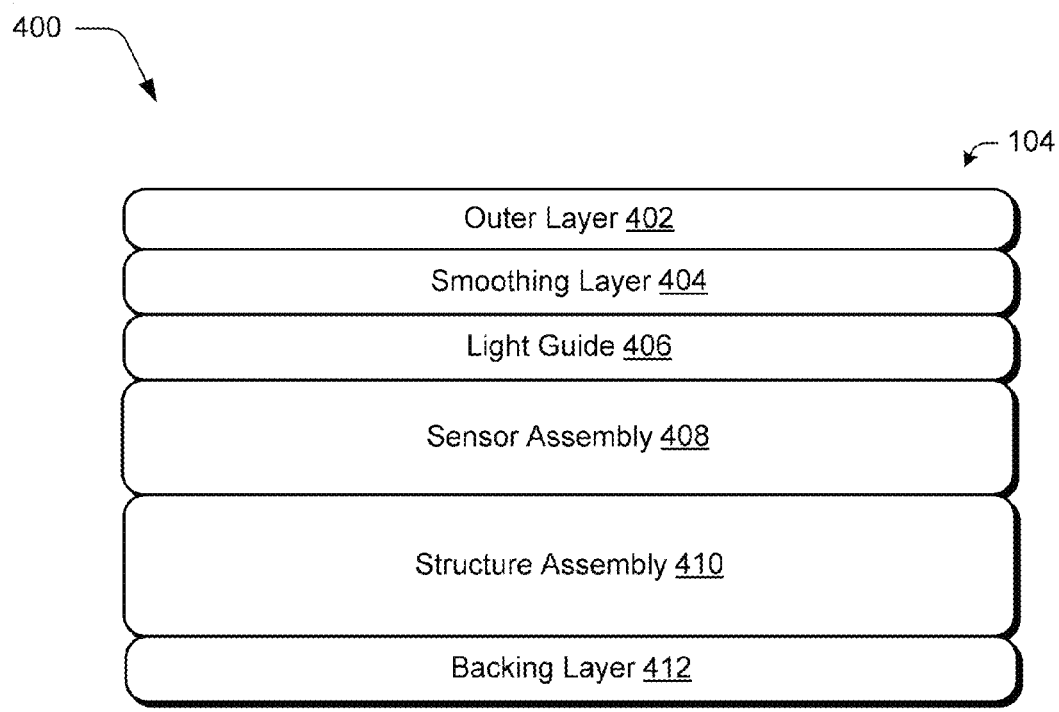
FIG. 4 depicts an example implementation showing a cross section of the input device of FIG. 1.

FIG. 4 depicts an example implementation 400 showing a cross section of input device 104 of FIG. 1. The outer layer 402, which may correspond to the outer layer 114 of FIG. 1, is configured to supply an outer surface of the input device 104 with which a user may touch and interact. The outer layer 402 may be formed in a variety of ways, such as from layers of fabric material (e.g., a backlight compatible polyurethane with a heat emboss for key formation) as further described beginning in relation to FIG. 6.

Beneath the outer layer is a smoothing layer 404. The smoothing layer 404 may be configured to support a variety of different functionality. This may include use as a support to reduce wrinkling of the outer layer 402, such as through formation as a thin plastic sheet, e.g., approximately 0.125 millimeters of polyethylene terephthalate (PET), to which the outer layer 402 is secured through use of an adhesive. The smoothing layer 404 may also be configured to including masking functionality to reduce and even eliminate unwanted light transmission, e.g., "bleeding" of light through the smoothing layer 404 and through a fabric outer layer 402. The smoothing layer also provides a continuous surface under the outer layer, such that it hides any discontinuities or transitions between the inner layers.

A light guide 406 is also illustrated, which may be included as part of the backlight mechanism 112 of FIG. 1 to support backlighting of indications (e.g., legends) of inputs of the input device 104. This may include illumination of keys of a keyboard, game controls, gesture indications, and so on. The light guide 406 may be formed in a variety of ways, such as from a 250 micron thick sheet of a plastic, e.g., a clear polycarbonate material with etched texturing. Additional discussion of the light guide 406 may be found beginning in relation to FIG. 5.

A sensor assembly 408 is also depicted. Thus, as illustrated the light guide 406 and the smoothing layer 404 are disposed between the outer layer 402 and the sensor assembly 408. The sensor assembly 408 is configured detect proximity of an object to initiate an input. The detected input may then be communicated to the computing device 102 (e.g., via the connection portion 202) to initiate one or more operations of the computing device 102. The sensor assembly 408 may be configured in a variety of ways to detect proximity of inputs, such as a capacitive sensor array, a plurality of pressure sensitive sensors (e.g., membrane switches using a pressure sensitive ink arranged in an array to support key strokes and gestures), mechanical switches, a combination thereof, and so on.

A structure assembly 410 is also illustrated. The structure assembly 410 may be configured in a variety of ways, such as a trace board and backer that are configured to provide rigidity to the input device 104, e.g., resistance to bending and flexing. A backing layer 412 is also illustrated as providing a rear surface to the input device 104. The backing layer 412, for instance, may be formed from a fabric similar to an outer layer 402 that omits one or more sub-layers of the outer layer 402, e.g., a 0.38 millimeter thick fabric made of wet and dry layers of polyurethane. Although examples of layers have been described, it should be readily apparent that a variety of other implementations are also contemplated, including removal of one or more of the layers, addition of other layers (e.g., a dedicated force concentrator layer, mechanical switch layer), and so forth. Thus, the following discussion of examples of layers is not limited to incorporation of those layer in this example implementation 400 and vice versa.

Figure 5:
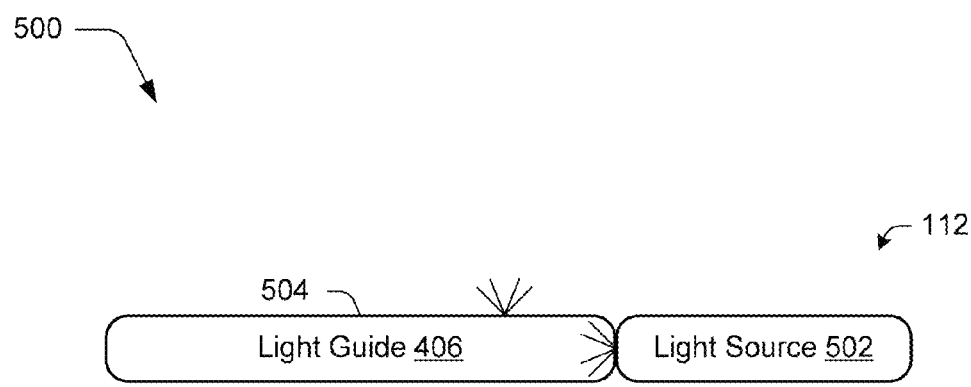
FIG. 5 depicts an example implementation of the backlight mechanism of FIG. 1 as including a light guide of FIG. 4 and a light source.

FIG. 5 depicts an example implementation 500 of the backlight mechanism of FIG. 1 as including a light guide 406 of FIG. 4 and a light source. As previously described, the light guide 406 may be configured in a variety of ways to support transmission of light that is to act as a backlight for the input device 102. For example, the light guide 406 may be configured from a clear plastic or other material that supports transmission of light from a light source 502, which may be implemented using one or more light emitting diodes (LEDs). The light guide 406 is positioned to receive the emitted light from the light source 502 through a side of the light guide 406 and emit the light through one or more other sides and/or surface regions of the light guide 406.

The light guide 406, for instance, may be configured to output light at specific locations through use of etching, embossing, contact by another material having a different refractive index (e.g., an adhesive disposed on the plastic of the light guide 406), and so on. In another example, the light guide 406 may be configured as a universal light guide such that a majority (and even entirety) of a surface of the light guide 406 may be configured output light, e.g., through etching of a majority of a surface 504 of the light guide 406. Thus, instead of specially configuring the light guide 406 in this example, the same light guide may be used to output different indications of inputs, which may be used to support different languages, arrangements of inputs, and so on by the input device 104.

As previously described, however, this could cause bleeding of light through adjacent surfaces to the light guide in conventional techniques, such as through an outer layer 402 of fabric to give a "galaxy" effect, pinholes, and so on. Accordingly, one or more of these adjacent layers may be configured to reduce and even prevent transmission of light in undesirable locations, an example of which that involves configuration of the outer layer 402 is described as follows and shown in a corresponding figure.

Figure 6:
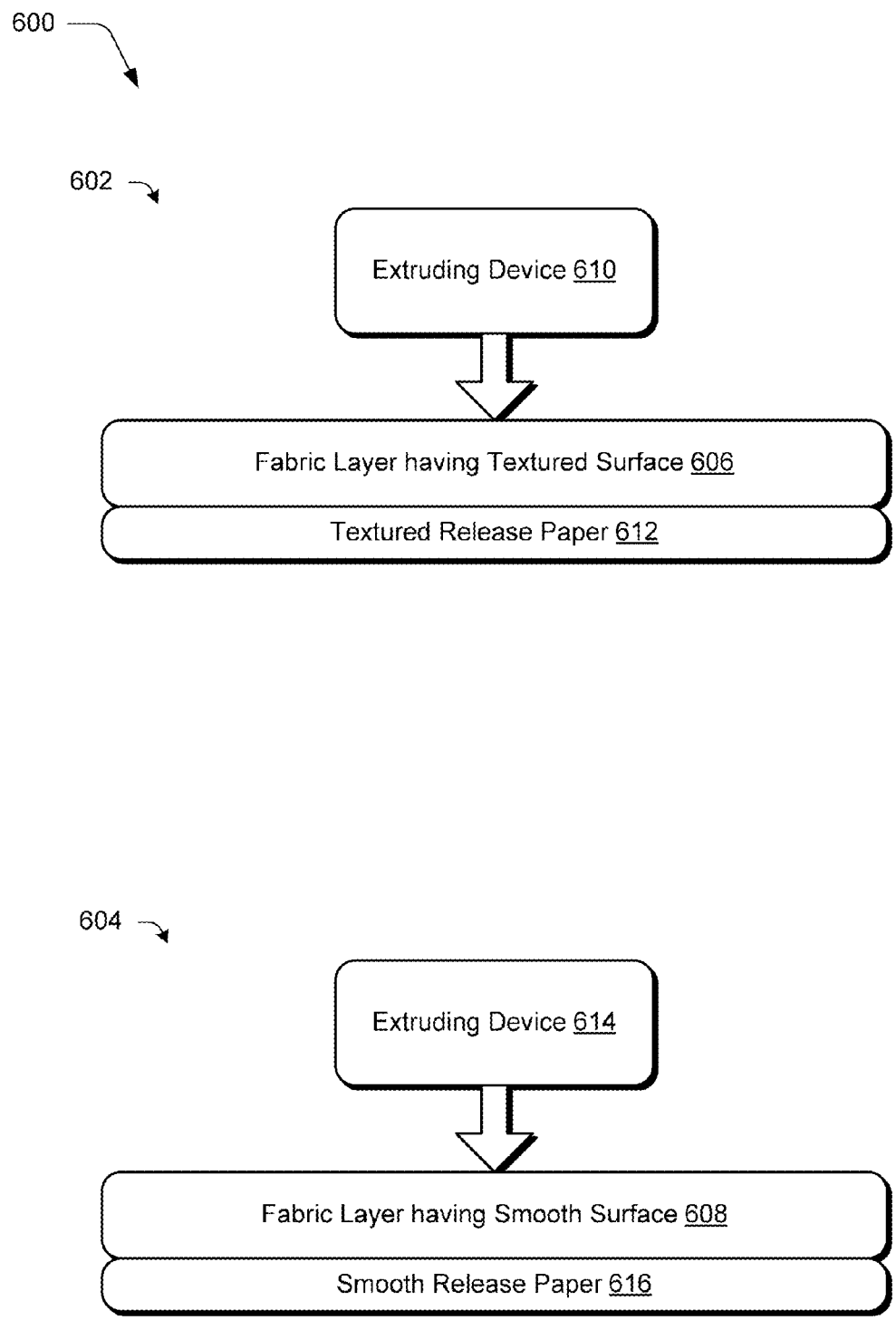
FIG. 6 depicts an example implementation of formation of fabric layers for inclusion as part of the outer layer of FIG. 4.

FIG. 6 depicts an example implementation 600 of formation of fabric layers for inclusion as part of the outer layer 402 of FIG. 4. The example implementation 600 is illustrated as including a plurality of stages 602, 604 which may be performed in any order. At the first stage 602, a fabric layer having a textured surface 606 is formed. This is performed by an extruding device 610 (e.g., a lamination device) that is configured to dispose a flexible material onto a textured release paper 612.

The extruding device 610, for example, may extrude a material such as polyurethane onto the textured release paper 612 to obtain a desired texture for an outer surface of an apparatus, such as the input device 104 of FIG. 1. The textured relates paper 612 may be configured to support a variety of different textures, such as to mimic a feel of leather, a woven material, microfiber, and so on.

The textured release paper 612 is configured to supply a desired texture to these laminations. For example, the textured release paper 612 may be configured to mimic a desired texture, such as a fabric texture, woven texture, leather-like feel, and so on. In this way, the release paper 502 may provide a roughness to an outer surface of the outer layer 402 supporting a desired feel to an apparatus that incorporates the outer layer 402, e.g., the input device 104 of FIG. 1.

At the second stage 604, a fabric layer having a smooth surface 608 is formed. This is also performed by an extruding device 614 (e.g., a lamination device) that is configured to dispose a flexible material onto a smooth release paper 616 in this example. Thus, the fabric layer having the smooth surface 608 may have a surface that is smoother than a surface of the fabric layer having the textured surface 606. This may be utilized to support a variety of functionality.

For example, it has been found that a "pinhole" or "galaxy" effect is typically amplified for fabrics having a texture with deep peaks and valleys. Accordingly, the reverse is also true in that a fabric that does not have a texture with deep peaks and valleys may have a greater resistance to this effect, such as the fabric layer having a smooth surface 608. Accordingly, these fabric layers may be combined to form the outer layer to support a desired texture yet permit use with a backlight mechanism 112, an example of which is described in greater detail below and shown in a corresponding figure.

Figure 7:
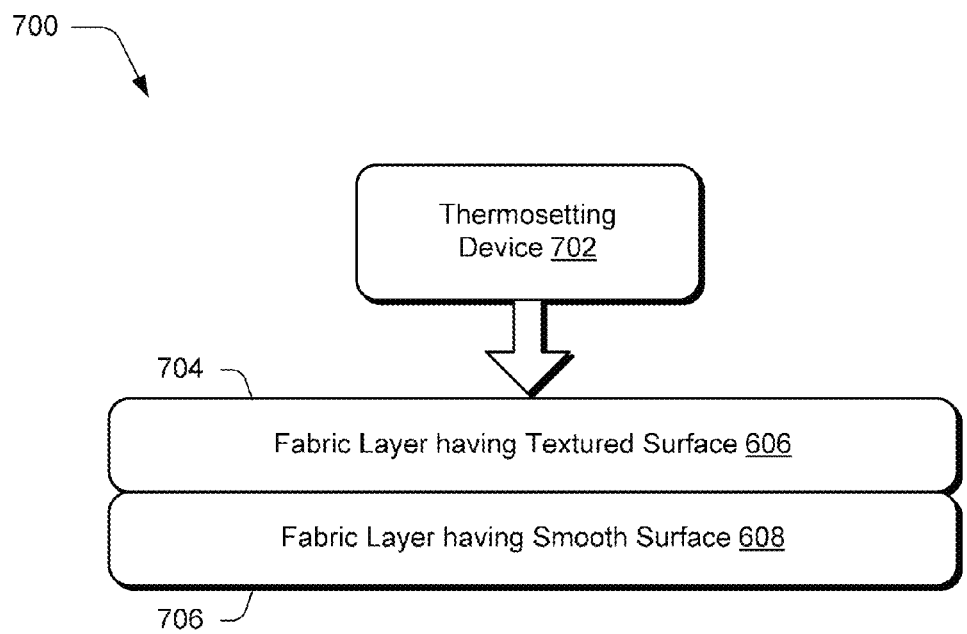
FIG. 7 depicts an example implementation of a system that is configured to secure the fabric layers of FIG. 6 to each other.

FIG. 7 depicts an example implementation 700 of a system that is configured to secure the fabric layers of FIG. 6 to each other. In this example, a thermosetting device 702 is utilized to secure the fabric layer having the textured surface 606 to the fabric layer having the smooth surface 608. Further, this is performed such that the textured 704 and smooth 706 surfaces are exposed once secured. In this way, the textured 704 surface may provide an outer surface of an apparatus (e.g., the input device 104) and the smooth 706 surface may be disposed proximal to a light guide to reduce transmission of pinholes through the fabric layer having the texture surface 606.

For instance, even if the fabric layer having the smooth surface 608 includes pinholes, a number of pinholes included is less than a number of pinholes in the fabric layer having the textured surface 606. Additionally, a likelihood that pinholes in the fabric layer having the smooth surface 608 align with pinholes in the fabric layer having the textured surface 606 may be relatively small and thus further decrease an ability of light to pass through both layers. Although thermosetting was described, a wide variety of other techniques to secure the layers together are also contemplated without departing from the spirit and scope thereof, such as use of an adhesive, mechanical, and so on.

Figure 8:
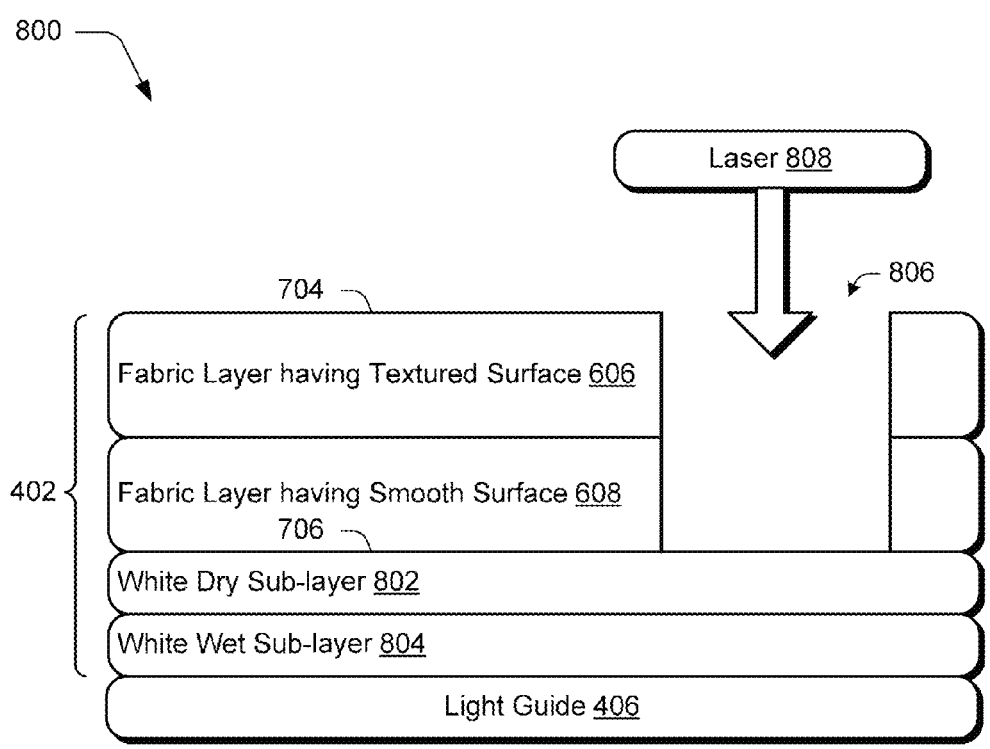
FIG. 8 depicts an example implementation in which the outer layer of FIG. 4 is shown in greater detail as disposed adjacent to a light guide.

FIG. 8 depicts an example implementation 800 in which the outer layer 402 of FIG. 4 is shown in greater detail. In this example, the outer layer 402 is disposed over a light guide 406 such that a smooth 706 surface faces the light guide 406 and the textured 704 surface is positioned as an outer surface of the device, e.g., the input device 104 of FIG. 1.

The outer layer 402 includes the fabric layer having the textured surface 606 and the fabric layer having the smooth surface 608 as previously described. In this example, however, the fabric layers have different shades to support use of different colors for use on an outer surface of the device yet still resist light transmission from the light guide 406 through the layers.

The fabric layer having the textured surface 606, for instance, may be disposed adjacent to the fabric layer having the smooth surface 608 that has a shade that is darker. Thus, in this example the layers get progressively darker to provide increasing amounts of resistance to light transmission the closer the layer is positioned to the light guide 408 of FIG. 4. This may be used to support a variety of different functionality.

For instance, lighter colors may be configured to block less light and therefore use of these lighter colors by the input device 104 may cause additional light to "bleed" through these layers. However, in some instances it may be desirable to use a light color at the outer layer 402, e.g., to create a red, yellow, orange, tan or other light colored input device. Additionally, if a significantly darker layer is disposed immediately beneath this fabric layer (e.g., to prevent light transmission by using a dark charcoal or black layer for the mask sub-layer 608), that darker layer may also be viewable through the lighter-colored fabric.

Accordingly, the fabric layer having the smooth surface 608 may be utilized that is the same or similar (e.g., complimentary) in color to the color used by the fabric layer having the textured surface 606 but is a shade darker than that layer. In this way, the appearance of the fabric layers may be maintained and yet provide for reduced transmission of light emitted from the light guide 408 of FIG. 4, such as to support use of a universal light guide as previously described.

A white dry sub-layer 802 and a white wet layer 804 are illustrated as disposed beneath the fabric layers. The white dry sub-layer 802 may be formed from a dry polyurethane that is bonded to a white wet layer 804, formed from a wet bath of polyurethane. The white wet layer 804 may contain an embedded woven material that may be used to acts as a carrier and provide tensile and structural properties to the outer layer 402 and may be utilized to provide a plush, cushioned feel to the outer layer 402.

An opening 806 may then be formed through the fabric layers having the textured and smooth surfaces 606, 608, respectively, through which light from the light guide 406 may pass. The light from the light guide 406 may also illuminate the white dry and wet sub-layer combination 802, 804, e.g., to provide a white backlighting in this example but other colors are also contemplated. The opening 806 may be formed in a variety of ways, such as through use of a laser 808 as illustrated, heat embossing, and so on. In this way, the resistance to light transmission supported by the fabric layers having the textured and smooth surface 606, 608 of the outer layer 402 may support use of light guide 406 in a universal configuration such that different light guides are not utilized for different indications, e.g., different legends for different languages. Other layers may also be configured to support use of the universal light guide configuration, an example of which is described as follows and shown in a corresponding figure.

Example Procedures

The following discussion describes input device outer layer and backlighting techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

FIG. 9 depicts a procedure 900 in an example implementation in which a device is formed having an outer layer configured to support a backlight. A fabric layer is obtained that has a textured surface formed by disposing a material on a textured release paper (block 902) and a fabric layer is obtained that has a smooth surface formed by disposing a material on a smooth release paper that is smoother than the textured release paper (block 904). As shown in FIG. 6, for instance, different release papers may be used such that one release paper is smoother than the other.

The fabric layers are secured to each other such that the textured surface and the smooth surface are exposed (block 906). As shown and discussed in relation to FIG. 7, a variety of different techniques may be utilized, such as thermosetting, adhesives, mechanical binding, and so on.

One or more portions are formed in the secured fabric layers to permit transmission of light (block 908). The portions, for instance, may be used to indicate corresponding inputs, such as keys in a keyboard as shown in FIG. 1, branding of a device, logos, and so forth.

The secured fabric layers are disposed proximal to a light guide such that light from the light guide is configured to pass through the one or more portions in the secured fabric layers (block 910). This configuration may be performed in a variety of ways, such as through use of openings 806 as shown in FIG. 8, use of a transparent or translucent material that is configured to also act as a light guide, and so forth.

A device is formed, for use in conjunction with a computing device, which includes the disposed secured fabric layers and light guide (block 912). The device, for instance, may be configured as an input device 104 as shown in FIG. 1. A variety of other configurations are also contemplated, such as a cover for a device, clothing or other textile articles having backlit portions that are controllable by a computing device (e.g., an integrated controller), and so forth.

Example System and Device

Figure 10:
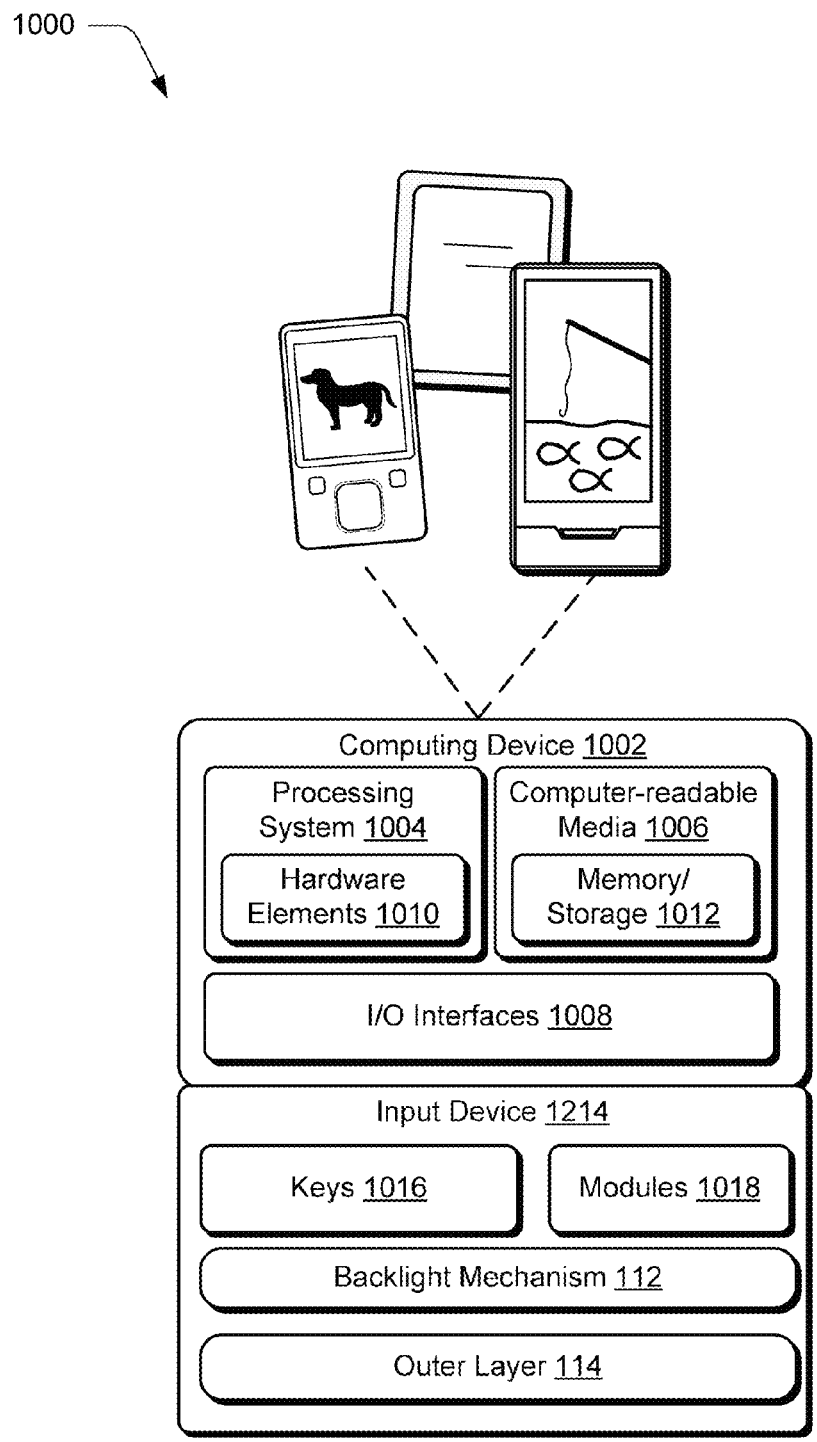
FIG. 10 illustrates an example system generally at that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. The computing device 1002 may be, for example, be configured to assume a mobile configuration through use of a housing formed and size to be grasped and carried by one or more hands of a user, illustrated examples of which include a mobile phone, mobile game and music device, and tablet computer although other examples are also contemplated. The input device 1014 may also be configured to incorporate a backlight mechanism 110 and outer layer 114 as previously described. The outer layer 114 may also be incorporated as part of the computing device 1002 itself of any other peripheral device, cover, article of clothing, and so forth.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1010 may include volatile media (such as random access memory (RAM)) and/or nonvolatile media (such as read only memory (ROM), Flash memory, optical disks, magnetic disks, and so forth). The memory/storage component 1010 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways to support user interaction.

The computing device 1002 is further illustrated as being communicatively and physically coupled to an input device 1014 that is physically and communicatively removable from the computing device 1002. In this way, a variety of different input devices may be coupled to the computing device 1002 having a wide variety of configurations to support a wide variety of functionality. In this example, the input device 1014 includes one or more keys 1016, which may be configured as pressure sensitive keys, mechanically switched keys, and so forth.

The input device 1014 is further illustrated as include one or more modules 1018 that may be configured to support a variety of functionality. The one or more modules 1018, for instance, may be configured to process analog and/or digital signals received from the keys 1016 to determine whether a keystroke was intended, determine whether an input is indicative of resting pressure, support authentication of the input device 1014 for operation with the computing device 1002, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:
1. An input device comprising:
a light guide configured to transmit light;

a sensor assembly having a plurality of sensors that are configured to detect proximity of an object as a corresponding one or more inputs;

a connection portion configured to form a communicative coupling to a computing device to communicate the one or more inputs received by the sensor assembly to the computing device; and an outer layer disposed proximal to the light guide such that the light guide is positioned between the outer layer and the sensor assembly, the outer layer having one or more portions configured to permit transmission of light from the light guide to act as a backlight, the outer layer having a textured outer surface and a smooth inner surface that is disposed proximal to the light guide.

2. An input device as described in claim 1, wherein the outer layer is formed to include a fabric layer having the textured outer surface and a fabric layer having the smooth surface.

3. An input device as described in claim 2, wherein the fabric layer having the smooth surface is formed using a release paper that has a smoothness that is greater that a release paper used to form the fabric layer having the textured surface.

4. An input device as described in claim 2, wherein the fabric layer having the smooth surface has a shade that is darker than a shade of the fabric layer having the textured surface.

5. An input device as described in claim 2, wherein the one or more portions are configured to permit transmission of light from the light guide through formation as openings through the fabric layer having the textured outer surface and the fabric layer having the smooth surface.

6. An input device as described in claim 2, wherein the fabric layer having the smooth surface is thermoset to the fabric layer having the textured surface.

7. An input device as described in claim 2, wherein the fabric layer having the smooth surface and the fabric layer having the textured surface are formed from a material having matching chemistries.

8. An input device as described in claim 1, wherein the outer layer is formed from polyurethane (PU).

9. An input device as described in claim 8, wherein the polyurethane (PU) is formed as a fabric.

10. An input device as described in claim 1, wherein the one or more portions configured to permit transmission of light are configured to indicate inputs supported by the input device.

11. An apparatus comprising:
a light guide configured to transmit light;
one or more sensors configured to detect proximity of an object; and
an outer layer formed as a fabric and disposed proximal to the light guide, the outer layer having one or more portions configured to permit transmission of light from the light guide, the light guide positioned between the outer layer and the one or more sensors, the outer layer including:
a fabric layer having a textured outer surface; and
a fabric layer having a smooth surface disposed proximal to the light guide and configured to have a resistance to transmission of light from the light guide that is greater than the fabric layer having the textured outer surface.

12. An apparatus as described in claim 11, wherein both fabric layers are formed using polyurethane (PU).

13. An apparatus as described in claim 11, wherein the fabric layer having the smooth surface is formed using a release paper that has a smoothness that is greater that a release paper used to form the fabric layer having the textured surface.

14. An apparatus as described in claim 11, wherein the fabric layer having the smooth surface has a shade that is darker than a shade of the fabric layer having the textured surface.

15. An apparatus as described in claim 11, wherein the fabric layer having the smooth surface is thermoset to the fabric layer having the textured surface.

16. A keyboard device comprising:
a light guide configured to transmit light;
a sensor assembly having a plurality of sensors that are configured to detect proximity of an object as a corresponding one or more inputs;
a connection portion configured to form a communicative coupling to a computing device to communicate the one or more inputs received by the sensor assembly to the computing device; and
an outer layer disposed proximal to the light guide such that the light guide is positioned between the outer layer and the sensor assembly.

17. The keyboard device of claim 16, wherein the outer layer has one or more portions configured to permit transmission of light from the light guide to act as a backlight.

18. The keyboard device of claim 16, wherein the outer layer has a textured outer surface and a smooth inner surface that is disposed proximal to the light guide.

19. The keyboard device of claim 16, wherein the keyboard device is configured to act as a cover for the computing device.

20. The keyboard device of claim 16, wherein the connection portion enables a removable coupling of the keyboard device to the computing device.

* * * * *